United States Patent [19]

Kitamura et al.

[11] Patent Number: 4,854,435

[45] Date of Patent: Aug. 8, 1989

[54] DOUBLE-NOTCHED SPRAG OUTER RETAINER

[75] Inventors: Noboru Kitamura; Norio Komatsubara, both of Fujisawa, Japan

[73] Assignee: NSK-Warner Kabishiki Kaisha, Japan

[21] Appl. No.: 145,010

[22] Filed: Jan. 19, 1988

[30] Foreign Application Priority Data

Jan. 16, 1987 [JP] Japan .................................. 62-6147

[51] Int. Cl.⁴ .......................................... F16D 41/07
[52] U.S. Cl. .................................. 192/41 A; 192/45.1
[58] Field of Search ........................... 192/41 A, 45.1; 188/82.8

[56] References Cited

U.S. PATENT DOCUMENTS

| | | | |
|---|---|---|---|
| 2,636,584 | 4/1953 | Swenson | 192/45.1 |
| 2,824,636 | 2/1958 | Troendly et al. | 192/45.1 |
| 2,927,671 | 3/1960 | Sand | 192/45.1 |
| 3,194,369 | 7/1965 | Witte | 192/45.1 |
| 4,635,770 | 1/1987 | Shoji et al. | 192/41 A |

FOREIGN PATENT DOCUMENTS 2155419 5/1973 Fed. Rep. of Germany ..... 192/45.1

Primary Examiner—Rodney H. Bonck
Assistant Examiner—Richard M. Lorence
Attorney, Agent, or Firm—Skjerven, Morrill, MacPherson, Franklin & Friel

[57] ABSTRACT

A sprag outer retainer ring of a sprag-synchronized one-way clutch assembly includes a plurality of pockets formed in a circumferential direction at a predetermined pitch. Each of the pockets is defined by a generally rectangular sprag insertion hole and a pair of notches formed on opposite side edges of the sprag insertion hole and continuously therewith. Thus, the pocket is generally symmetrical in shape and thus the present outer retainer ring may be used irrespective of the lock direction.

5 Claims, 3 Drawing Sheets

DOUBLE-NOTCHED SPRAG OUTER RETAINER

BACKGROUND OF THE INVENTION

1. Field of the Invention

This invention generally relates to a one-way clutch, and, in particular, to an sprag outer retainer ring of a sprag-synchronized one-way clutch assembly.

2. Description of the Prior Art

A sprag-synchronized one-way clutch is well known in the art and one such example is schematically shown in FIG. 1. As shown, a sprag-synchronized one-way clutch assembly 1 is typically interposed between an inner ring 2 and an outer ring 3, which are provided to be rotatable concentrically and relative to each other. When the inner and outer rings 2 and 3 try to rotate in the opposite directions indicated by the arrows in FIG. 1, the relative rotation between the inner and outer rings 2 and 3 are prevented by the one-way clutch assembly 1; whereas, if the inner and outer rings 2 and 3 are driven to rotate in the opposite directions and opposite to the directions indicated by the arrows, a relative rotation between the inner and outer rings 2 and 3 is allowed to take place.

The sprag-synchronized one-way clutch assembly 1 includes a pair of outer and inner retainer rings 4 and 5, each of which is formed with a plurality of sprag insertion holes 4a and 5a, respectively, as arranged in the circumferential direction as spaced apart from one another at a predetermined pitch. The assembly 1 includes a plurality of sprags 6 arranged in the circumferential direction, each of which has a particular cross-sectional shape similar to the figure of "8." Each of the plurality of sprags 6 is set in position with its upper portion fitted into a corresponding sprag insertion hole 4a formed in the sprag outer retainer ring 4 and its lower portion fitted into a corresponding sprag insertion hole 5a formed in the sprag inner retainer ring 5. Preferably, each of the sprags 6 has an outer cam surface 6a and an inner cam surface 6b, each of which is defined by one, two or more radii of curvature.

Also provided between the sprag inner and outer retainers 4 and 5 of the assembly 1 is a ribbon spring 7 which is used to normally impart a moment to each of the sprags 6 in a predetermined direction. The ribbon spring 7 is formed with a plurality of sprag insertion holes 7a as spaced apart from one another at a predetermined pitch, and when the sprags 6 are set in position, the central portion of each of the sprags 6 is supported by the ribbon spring 7. The ribbon spring 7 is generally elongated in shape and made of a relatively thin plate. When the ribbon spring 7 is set in position with each of the sprags 6 inserted in the corresponding sprag insertion hole 7a, the opposite ends of the ribbon spring 7 are brought together to form a generally ring shape. The ring-shaped ribbon spring 7 is located between the outer and inner retainer rings 4 and 5. As shown in FIG. 1, when assembled, the ribbon spring 7 always applies a moment to each of the sprags 6 in the direction indicated by arrows A, so that all of the sprags 6 are given a tendency to be brought into contact with the inner and outer rings 2 and 3.

The general structure of the ribbon spring 7 is illustrated in FIGS. 2a and 2b. In the illustrated example, the ribbon spring 7 is elongated in shape and comprised of a thin plate of stainless steel or the like, and a plurality of generally C-shaped sprag insertion holes 7a are formed at a predetermined pitch. A tab 7d having a predetermined width is formed in each of the sprag insertion holes 7a as a projection projecting into the corresponding hole 7a in a predetermined direction from one side edge of the hole. FIG. 2b is a side view of the ribbon spring 7 shown in FIG. 2a. The illustrated ribbon spring 7 includes a pair of side sections 7b, 7b and a plurality of cross-bar or bridge sections 7c, each extending between the pair of side sections 7b, 7b, arranged in a longitudinal direction as spaced apart from one another at a predetermined pitch. And, a sprag insertion hole 7a is defined by the pair of side sections 7b, 7b and a pair of bridge sections 7c, 7c. In addition, the tab 7d is formed as projecting into the sprag insertion hole 7a from one side edge of the corresponding bridge section 7c. As a result, the sprag insertion hole 7a is constructed generally in the shape of letter "C."

The ribbon spring 7 is provided for imparting a moment to each of the sprags 6 in a predetermined direction indicated by arrows A shown in FIG. 1 so as to provide a tendency for the sprags 6 to be brought into contact with the inner and outer rings 2 and 3 to thereby establish a clutched condition. For this purpose, the tab 7d is required to apply an appropriate pressing force to the associated sprag 6. Furthermore, a wavy bent portion or wrinkle 7e is formed in the ribbon spring 7 at a predetermined pitch along the longitudinal axis of the ribbon spring 7. In the illustrated example, the wrinkles 7e are provided at the same pitch as that of the sprag insertion holes 7a. The wrinkles 7e are formed as bent in a predetermined shape at the same side of the spring 7, and each of the wrinkles 7e is formed as extending across the pair of side sections 7b, 7b and the corresponding tab 7d.

FIG. 3 illustrates the condition in which sprags 6 are set in position as inserted in the corresponding insertion holes 4a of the outer retainer ring 4. Each of the sprag insertion holes 4a is generally in the shape of a rectangle and a notch 4b is formed at the right side edge of each of the sprag insertion holes 4a. The notch 4b is formed by cutting away or removing a part of the side portion of the sprag insertion hole 4a which corresponds in position to the tab 7d so as to avoid any interference in motion with the tab 7d of the ribbon spring 7. That is, the tab 7d moves up and down in accordance with the operation of the one-way clutch assembly 1, and, in order to prevent the tab 7d from being interfered in this up and down motion, the notch 4b is formed to provide a relief space for the tab 7d. As shown in FIG. 2a, tab 7d is provided only at one side edge of the bridge section 7c, and, since the tab 7d is supposed to serve as an element for pushing the associated sprag 6 in its locked or clutched position, it is formed as projecting in the lock direction. Thus, in the case of one-way clutch assembly having an opposite lock direction, it is necessary to provide the notch 4b at the opposite side edge of the insertion hole as shown in FIG. 4. In this manner, since the lock direction can be either one of the two, it is necessary to prepare two kinds of outer retainers 4 different in the location of the notch 4b. The outer retainer 4 is also formed with a flange 4c which is typically formed with a so-called T-bar as a means for securely attaching the outer retainer 4 to the outer ring 3.

The structure of the sprag insertion hole 4a formed in the prior art outer retainer 4 is illustrated in FIG. 5. As shown, the notch 4b generally rectangular in shape is formed at one side edge of the generally rectangularly shaped sprag insertion hole 4a. FIG. 6 is a perspective view showing the above-described prior art outer retainer ring 4 formed with notches 4b, each formed at one side edge of each of the sprag insertion holes 4a. Such a sprag insertion hole 4a which has a notch 4b at one side edge is normally formed by stamping, and one such example of stamping process is shown in FIG. 7. As shown, a ring-shaped outer retainer 4 is placed on a die 10 and a punch 11 having a predetermined cross-sectional shape is pushed into a hole of the die 10 as indicated by the white arrow, so that a sprag insertion hole 4a having a notch 4b can be formed at the same time. Such a sprag insertion hole 4a having a notch 4b is often termed as a pocket in its entirety, and a high dimensional precision is required for such a pocket because of the necessity to synchronize all of the sprags 6 inserted in the respective pockets. However, in the pocket of the prior art outer retainer 4, since the notch 4b is provided only at one side edge of the sprag insertion hole 4a, the pocket as a whole is asymmetrical in shape. Because of this, management of clearance between the die 10 and the punch 11 in press operation is extremely difficult, and skills and exorbitant amount of time were required for this press operation so as to maintain the required high precision. This problem mainly stems from the fact that a clearance D1 at the side edge of the sprag insertion hole 4a where no notch is provided differs, in general, from a clearance D2 at the other side edge where the notch 4b is provided.

SUMMARY OF THE INVENTION

In accordance with the principle of the present invention, there is provided a sprag outer retainer ring of a sprag-synchronized one-way clutch assembly, which has is formed with plurality of pockets in a circumferential direction at a predetermined pitch. Each of the pockets has a sprag insertion hole and a pair of notches formed at opposite side edges of the sprag insertion hole. Preferably, the pocket has a generally symmetrical shape as a whole. In the preferred embodiment, the pocket is formed by stamping.

It is therefore a primary object of the present invention to obviate the disadvantages of the prior art as described above and to provide an improved one-way clutch assembly.

Another object of the present invention is to provide an improved one-way clutch outer retainer ring simple in structure, easy to manufacture at high precision and thus low at cost.

A further object of the present invention is to provide an improved sprag outer retainer ring of a sprag-synchronized one-way clutch assembly which is not limited in a lock direction of associated sprags.

A still further object of the present invention is to provide an improved sprag-synchronized one-way clutch assembly high in performance.

Other objects, advantages and novel features of the present invention will become apparent from the following detailed description of the invention when considered in conjunction with the accompanying drawings.

DESCRIPTION OF THE PREFERRED EMBODIMENTS

Figure 1:
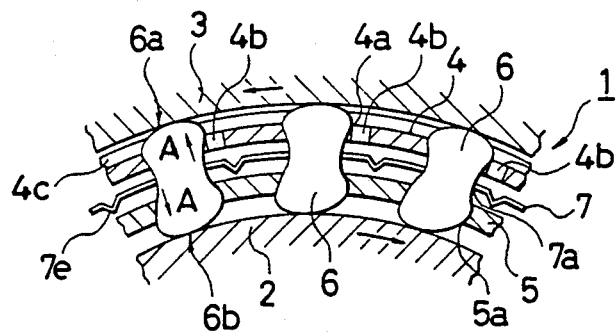
FIG. 1 is a schematic illustration showing the overall prior art structure of a sprag-synchronized one-way clutch assembly.
Figure 2A:
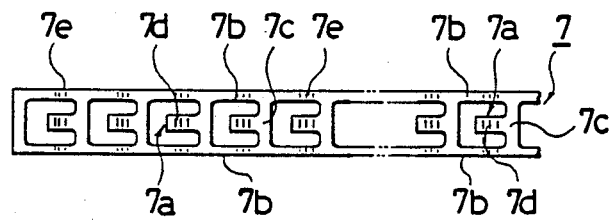
FIGS. 2a and 2b are schematic illustrations showing the ribbon string employed in the assembly shown in FIG; 1.
Figure 2B:
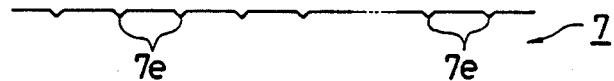
Figure 3:
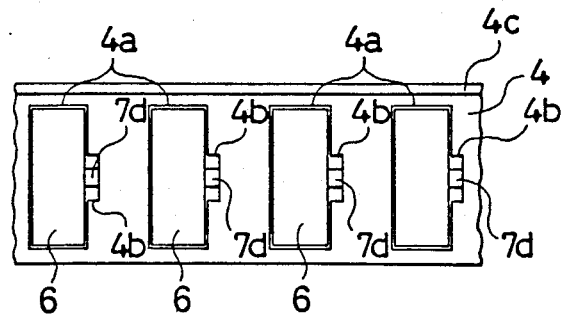
FIG. 3 is a schematic illustration showing the assembled condition of the sprag outer retainer ring 4 in the assembly 1 of FIG. 1.
Figure 4:
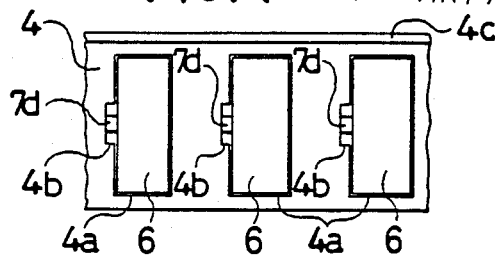
FIG. 4 is a schematic illustration showing the sprag outer retainer ring for a sprag-synchronized one-way clutch assembly having a clutch direction opposite to that of the clutch assembly of FIG. 3.
Figure 6:
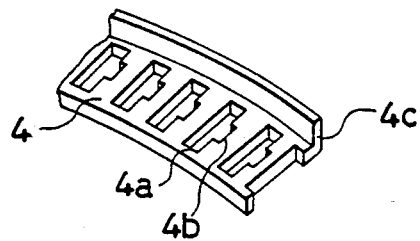
FIG. 6 is a schematic, perspective view showing the overall structure of the prior art sprag outer retainer ring 4.
Figure 8:
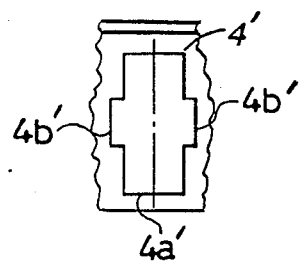
FIG. 8 is an illustration showing the shape of a pocket to be formed in an outer retainer ring of a sprag-synchronized one-way clutch assembly in accordance with one embodiment of the present invention.
Figure 5:
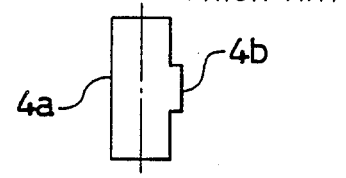
FIG. 5 is an illustration showing the shape of a pocket formed in the prior art outer retainer ring 4.
Figure 7:
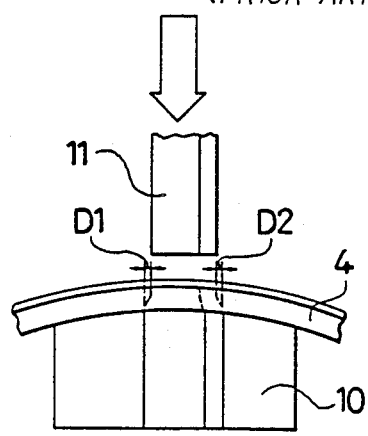
FIG. 7 is a schematic illustration showing a prior art press operation for stamping a pocket in a blank outer retainer ring 4.

Referring now to FIG. 8, there is shown the shape of a pocket to be formed in a sprag outer retainer ring 4' of a sprag-synchronized one-way clutch assembly in accordance with one embodiment of the present invention. As shown, in accordance with the principle of the present invention, a pocket to be formed in the outer retainer ring 4' has a generally rectangularly shaped sprag insertion hole 4a' and a pair of notches 4b' and 4b' formed at the opposite side edges of the sprag insertion hole 4a' by partial removal thereof. The notches 4b' and 4b' are continuous with the sprag insertion hole 4a' and the notches 4b' and 4b' are formed at the opposite side edges of the sprag insertion hole 4a' in the circumferential direction of the outer retainer ring 4'. As a result, the pocket shown in FIG. 8 has a generally symmetrical shape as a whole.

Figure 9:
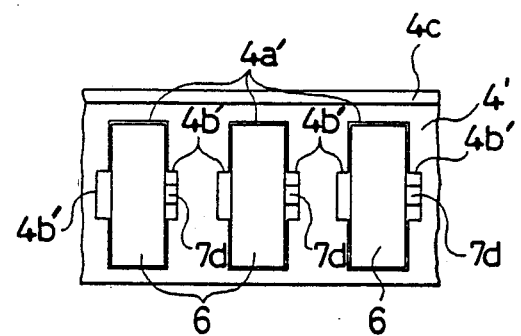
FIG. 9 is an illustration showing the condition in which an outer retainer ring of the present invention is assembled in a one-way clutch having a lock direction in one direction.
Figure 10:
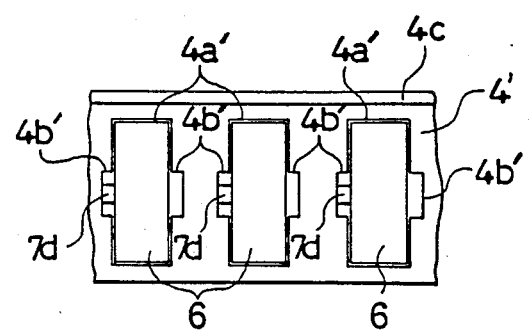
FIG. 10 is an illustration showing the condition in which the outer retainer of the present invention is assembled in a one-way clutch having a lock direction in the opposite direction.

FIG. 9 illustrates the condition in which the sprag outer retainer ring 4' constructed in accordance with one embodiment of the present invention has been assembled in one type of a sprag-synchronized one-way clutch assembly having a lock direction in one direction. As shown, in this case, the tab 7d of the ribbon spring 7 is located at the right side edge of the pocket. On the other hand, FIG. 10 illustrates the condition in which the same outer retainer ring 4' as that used in FIG. 9 has been assembled into another type of a sprag-synchronized one-way clutch having a lock direction in the opposite direction. As may be understood easily from these figures, the outer retainer ring 4' of the present invention may be used for either type of one-way clutch assembly without regard to the lock direction. In either type, the outer retainer ring 4' of the present invention does not interfere with the expected movement of the tabs 7d, so that it is only necessary to prepare only one kind of outer retainer ring 4' in accordance with the principle of the present invention.

In addition, a particularly importance aspect of the present invention resides in the fact that a pair of notches 4b' and 4b' identical in shape (rectangular in the illustrated embodiment) is formed on the opposite left and right side edges (opposite in the circumferential direction) of a sprag insertion hole 4a' having a rectangular shape, the resulting pocket defined by the sprag insertion hole 4a' and the pair of notches 4b' and 4b' is symmetrical in shape as a whole. Thus, in the case when this pocket is formed by a press operation, the clearance is set the same for each of the opposite side edges of the pocket. Since the clearance is the same between left and right and also between top and bottom because of the symmetrical nature of the desired pocket, a press operation for stamping such a pocket using a die and a punch can be carried out a balanced force relationship between left and right and between top and bottom. As a result, a stamping operation can be carried out at an extremely high precision. This indicates the possibility of forming a sprag outer retainer ring having pockets formed with high precision in dimension and pitch with ease and without requiring high and experienced skills.

As described in detail above, in accordance with the present invention, it is only necessary to prepare a sprag outer retainer ring of one kind because it can be used for a sprag-synchronized one-way clutch having a lock direction in either direction. Besides, the pocket is symmetrical in shape, a clearance is set at the same level for the left and right side edges, so that the process for forming such a pocket is extremely simplified and such a pocket can be formed at high precision and at high speed. Besides, no special skills are required for formation of such a symmetrical pocket, a sprag outer retainer ring can be manufactured at low cost.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An outer retainer for use in a double retainer type one-way clutch assembly including a ribbon string provided with a plurality of tabs for applying a bias force to associated sprags, said retainer being generally in the shape of a ring and formed with a plurality of sprag insertion holes at a predetermined pitch arranged in a circumferential direction of the ring, each of said sprag insertion holes being generally rectangular in shape and formed with a pair of identical notches facing each other at opposite side edges of said hole in alignment in said circumferential direction, each of said notches being formed substantially at the center of a corresponding side edge to provide a relief space for a corresponding tab of a ribbon spring.

2. The outer retainer of claim 1, wherein each of said sprag insertion holes and its associated pair of notches define a pocket which is generally symmetrical in shape.

3. The outer retainer of claim 2, wherein said pocket has been formed by stamping.

4. The outer retainer of claim 1, wherein said one-way clutch assembly is a sprag-synchronized one-way clutch assembly.

5. The outer retainer of claim 1, wherein said outer retainer is assembled with a ribbon spring having a plurality of tabs extending in a first lock direction wherein said tabs extend through one of said pair of notches in each sprag insertion hole on a corresponding side edge of each spring insertion hole and wherein when said plurality of tabs extend in a second lock direction opposite to said first lock direction, said tabs extend through the other of said pair of notches in each sprag insertion hole on an opposite corresponding side edge of each sprag insertion hole.

* * * * *